W. S. SUTTON.
SERVICE OUTLET FITTING FOR PNEUMATIC CLEANING SYSTEMS.
APPLICATION FILED AUG. 25, 1913.
1,096,278.   Patented May 12, 1914.
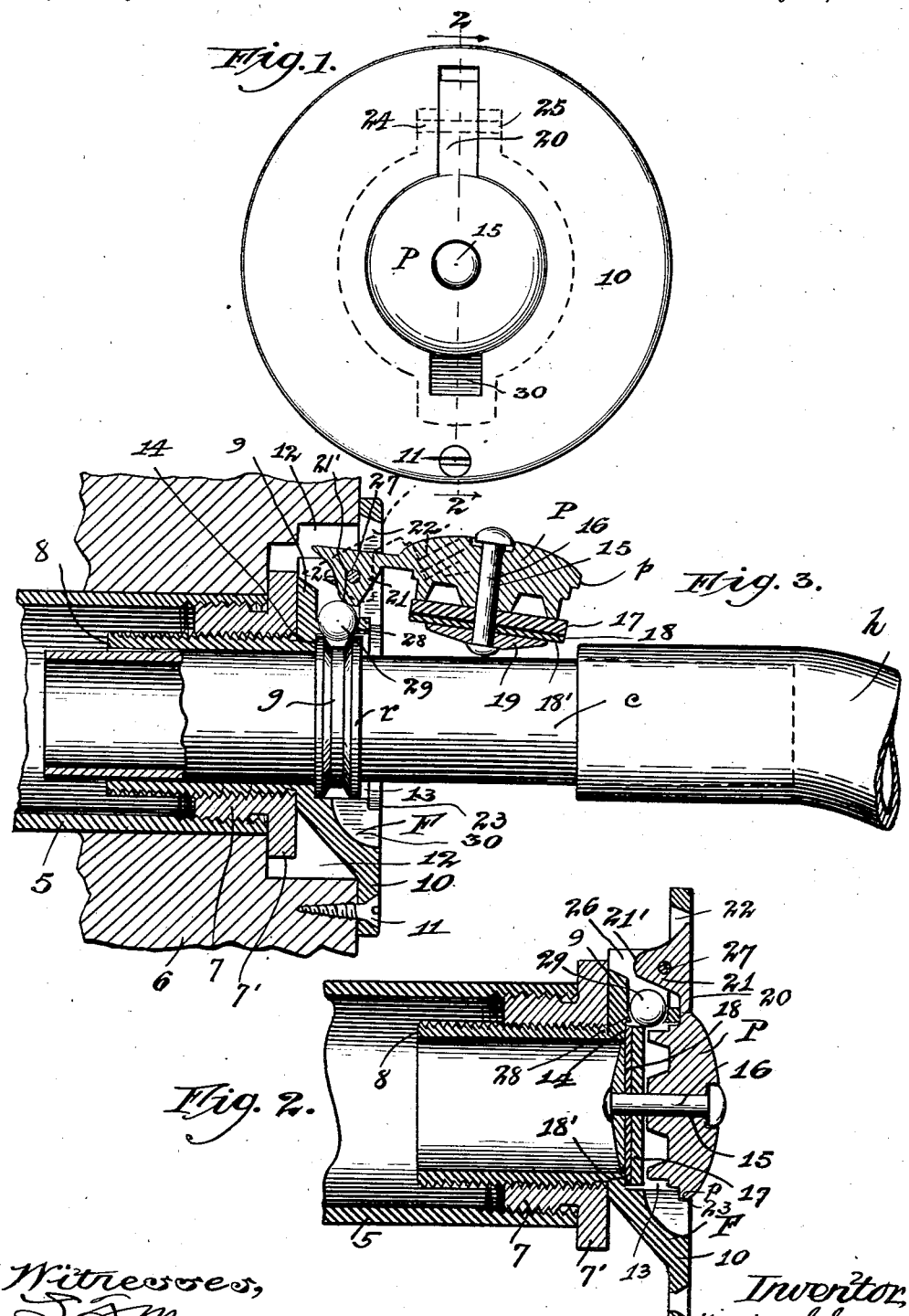

UNITED STATES PATENT OFFICE.

WILLIAM S. SUTTON, OF ROCKFORD, ILLINOIS, ASSIGNOR TO AMERICAN RADIATOR COMPANY, OF CHICAGO, ILLINOIS, A CORPORATION OF NEW JERSEY.

SERVICE-OUTLET FITTING FOR PNEUMATIC CLEANING SYSTEMS.

1,096,278.      Specification of Letters Patent.     Patented May 12, 1914.

Application filed August 25, 1913. Serial No. 786,522.

*To all whom it may concern:*

Be it known that I, WILLIAM S. SUTTON, a citizen of the United States, residing at Rockford, in the county of Winnebago and State of Illinois, have invented certain new and useful Improvements in Service-Outlet Fittings for Pneumatic Cleaning Systems, of which the following is a specification.

My invention relates to service outlet fittings for pneumatic cleaning systems, and particularly to improved coupling mechanism for locking the ends of the lead pipes from pneumatic cleaning devices into service position in service pipe outlet fittings.

In pneumatic cleaning systems for buildings, service pipes are usually run to the various floors or rooms and outlet fittings provided for such device for receiving the ends of the lead pipes of the pneumatic cleaning devices to connect such devices for service. During operation of the cleaning device and the back and forth movement of the lead pipe or hose, the connection between the lead pipe and the service pipe fittings is apt to loosen to allow leakage and consequent inefficient operation of the cleaning device. It is therefore very desirable that connection may be made readily with the service outlet without great exertion on the part of the operator and that disconnection may as readily be made, but at the same time air-tight connection should be maintained to prevent leakage.

One of the important objects of my invention is therefore to provide coupling means which will enable connection to be readily and easily made with a service pipe outlet and which will make and maintain air-tight connection.

Another object is to provide automatic operation of such coupling mechanism and to utilize parts of the outlet fitting for controlling the coupling.

My invention will be more readily understood by reference to the accompanying sheet of drawings in which—

Figure 1 is a front elevational view of an outlet fitting, Fig. 2 is a sectional view taken on plane 2—2, Fig. 1, and Fig. 3 is a similar sectional view showing the end of a lead pipe in coupling engagement.

5 represents the end of a service pipe forming part of a pneumatic cleaning system, this pipe terminating in the wall 6. The end of the pipe is internally threaded for receiving the reducing bushing 7 having the flange 7' for abutting against the pipe end. Threading into this bushing is the coupling sleeve 8 of the outlet fitting F, the intermediate hub part 9 of this fitting abutting against the flange 7' of the bushing. The outer end of the fitting is in the form of an escutcheon plate 10 secured by screws 11 against the inner face of the wall 6, the wall having the recess or pocket 12 for receiving the hub part 9 and the flange 7' of the reducing bushing. The fitting F has the pocket 13 concentric with sleeve 8 and of larger diameter in order to provide a valve seat 14. A closure plug structure P has the central passageway 15 for the valve stem 16 which carries at its end the valve disk 17, the leather washer 18 and the head 19, this head being of less diameter than the washer and valve disk to leave the annular seating surface 18', which surface is of substantially the same area as the valve seat 14. An arm 20 extends upwardly from the plug P and has the inwardly extending lug 21. The escutcheon plate 10 has the opening 22 for receiving the arm and lug and has the annular shoulder 23 concentric with the pocket 13 for seating the outer flange *p* of the plug. The outlet fitting above described is particularly adaptable for vacuum cleaning systems, the valve 17 being drawn against the seat 14 by the suction effect when the valve plug is in closed position as shown in Fig. 2, the valve stem 15 being of sufficient length to allow accurate seating of the valve.

Extending upwardly from the hub part 9 are two ears 24 and 25 forming a pocket 26 for receiving the lug 21, the pin 27 passing through the ears and lugs to thereby pivot the plug structure for vertical swing. Through the base of the lug pocket 26 is the conical opening 28 leading to the valve pocket 13 and in this opening is seated a coupling ball 29. The inner end of the lug has the rounded cam surface 21' which is away from the ball when the valve plug is fully closed or fully open, but which engages with the ball when the valve plug is moved from full open position toward horizontal position as illustrated in Fig. 3, the ball being then forced downwardly through the opening 28.

The lead from the cleaning devices is usually in the form of a hose length *h* provided at its end with a connecting pipe section c, this pipe being usually finished to fit accurately in the sleeve 8 of the outlet fitting to produce an air-tight fitting. In accordance with my invention I provide a locking or coupling ring r on the pipe section c having the peripheral V-shaped groove g. When the pipe length is inserted in the outlet fitting this ring abuts against the valve seat 14 and its groove g is below the locking ball 29. During insertion of the pipe in the fitting the valve plug P is held in its uppermost position as indicated in dotted lines Fig. 3, in which position the cam surface 21' is in front of the ball and the ball is free to move upwardly to allow passage of the ring r through the pocket 13 and against the valve seat 14. After the ring is in position the ball will of course drop into the groove g and the valve plug P is then released and allowed to drop against the pipe as shown in Fig. 3. In this position the surface 21' will be against the ball and will hold the ball securely in the groove g to lock the pipe c to the outlet fitting and to maintain air-tight connection. When it is desired to disconnect the lead from the fitting, the pipe plug P is raised sufficiently to swing its cam surface 21' clear of the ball and the pipe is then withdrawn. Upon such withdrawal the plug is dropped and it falls into the pocket 13 and the valve disk 17 is drawn by the suction against the seat 14 and the outlet is then sealed.

The valve plug structure P serves two functions, first, its normal function of carrying the valve mechanism for sealing the outlet, and second, it acts as a lever weight for the arm 21 to hold the cam surface 21' against the ball to maintain firm coupling and locking engagement. The opening 30 in the escutcheon plate 10 below the plug pocket is to enable the insertion of a suitable implement below the plug flange p in order that the plug may be forcibly moved sufficiently to withdraw the valve disk from its seat. After this releasing movement the plug can be readily swung to open position.

I thus provide a very simple yet highly efficient locking mechanism for maintaining air-tight connection between cleaning appliance leads and service outlets.

I do not of course desire to be limited to the exact construction and arrangement shown and described as modifications are no doubt possible which would come within the scope of the invention.

I claim the following:

1. In a service outlet fitting for pneumatic cleaning systems, the combination of an escutcheon part having a valve pocket, a sleeve communicating with said valve pocket and adapted for connection with a service pipe outlet, a valve plug pivoted to the escutcheon part to swing into said valve pocket, said escutcheon part having an opening extending radially to said valve pocket, a ball seated in said opening to move toward or away from said pocket, and a cam lug on said valve plug adapted to force said ball toward said pocket when said valve plug is in position intermediate its fully opened position and its closed position.

2. In a service outlet fitting for pneumatic cleaning systems, the combination of a hub part having a pocket, a sleeve extending from said hub part and adapted for connection with a service outlet, a plug for said pocket having an arm extending therefrom, lugs on said hub part, said plug arm extending between said lugs and a pivot pin extending through said lugs and arm whereby said plug is pivoted to swing into or out of said pocket, an opening through the hub part between said pocket and the space between said lugs, a ball seated in said opening, and an extension on said plug supporting arm adapted to prevent outward movement of said ball when said plug is in intermediate position.

3. A service outlet fitting for pneumatic cleaning systems comprising a bore for receiving the end of pneumatic appliance leads, an opening extending radially to said bore, a ball seated in said opening, an arm pivoted to said fitting and having an extension adapted in certain position of said arm to abut against said ball to prevent outward radial movement thereof, said arm being weighted.

4. In combination, a service outlet fitting for pneumatic cleaning systems having a central bore, a lead pipe end fitting in said bore and having a collar, a ball seated in said fitting adapted to engage with said collar, a plug for said fitting having a supporting arm extending therefrom, said arm being pivoted whereby said plug may be swung out of the fitting bore, and a cam lug on said arm for engaging with said ball when said plug is in intermediate position whereby said ball will be held against said lead pipe ring to lock said pipe to said fitting.

5. In combination a service outlet fitting for pneumatic cleaning systems having a valve pocket and a sleeve for connecting the fitting with a service pipe, a valve plug having a supporting arm pivoted to the fitting whereby the plug may be moved into the pocket to close the outlet or to be swung out of the pocket, a lead pipe terminal inserted in said fitting and having a locking collar, a radial opening in said fitting to said valve pocket, a ball adapted to extend through said opening into said pocket to engage with said ring, and a lug on said plug supporting arm adapted to engage with said ball to lock said ball against outward radial movement and to retain said ball in engagement with the locking ring to prevent disconnection of the lead terminal from the fitting.

6. In a service outlet fitting for pneumatic cleaning systems, the combination of an escutcheon part having a valve pocket, a sleeve extending from said escutcheon part for connecting such part with a service pipe outlet, a heavy circular valve plug for engaging in said pocket to close the outlet, a vertical radial slot in said escutcheon part above said valve pocket, an arm extending from said valve plug for engaging in said slot and having an inward extension, a pivot pin extending across said slot and receiving said extension to thereby pivot said arm to allow vertical swing of the valve plug, a ball pocket at the lower end of said slot having an opening communicating with the valve plug pocket, and a ball in said ball pocket for extending downwardly through said opening, said valve plug arm preventing escape of said ball from said pocket and the extension on said arm having a cam surface at its end for coöperating with said ball to release said ball when the valve plug is fully closed or is swung to its uppermost position and to lock the ball to project downwardly through the ball pocket opening when said valve plug is in intermediate or substantially horizontal position.

In witness whereof, I hereunto subscribe my name this 21st day of August, A. D. 1913.

WILLIAM S. SUTTON.

Witnesses:
 ROY H. BROWN,
 LOUISE LAWRENCE.